United States Patent
Hammad

(10) Patent No.: US 8,408,454 B2
(45) Date of Patent: Apr. 2, 2013

(54) MULTIFUNCTIONAL PORTABLE CONSUMER PAYMENT DEVICE

(75) Inventor: Ayman A. Hammad, Pleasanton, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 880 days.

(21) Appl. No.: 12/211,753

(22) Filed: Sep. 16, 2008

(65) Prior Publication Data

US 2010/0065626 A1    Mar. 18, 2010

(51) Int. Cl.
    *G06K 5/00*    (2006.01)
(52) U.S. Cl. .................................. 235/380; 235/492
(58) Field of Classification Search ............ 235/380, 235/492
    See application file for complete search history.

(56) References Cited

U.S. PATENT DOCUMENTS

| | | | | |
|---|---|---|---|---|
| 5,001,775 | A * | 3/1991 | Hayashi et al. | 455/158.5 |
| 5,559,885 | A * | 9/1996 | Drexler et al. | 235/380 |
| 6,098,890 | A * | 8/2000 | Kreft et al. | 235/492 |
| 2003/0132285 | A1* | 7/2003 | Blancas et al. | 235/380 |
| 2006/0165060 | A1* | 7/2006 | Dua | 370/352 |
| 2007/0063025 | A1 | 3/2007 | Blossom | |

FOREIGN PATENT DOCUMENTS

| | | |
|---|---|---|
| JP | 2003-060760 | 2/2003 |
| JP | 2003-060760 A | 2/2003 |
| KR | 10-2006-0030316 | 4/2006 |
| KR | 10-2006-0030316 A | 4/2006 |
| KR | 10-2007-0019051 | 2/2007 |
| KR | 10-2007-0019051 A | 2/2007 |

OTHER PUBLICATIONS

International Search Report mailed Jun. 15, 2009 in PCT/US2008/076711, 2 pages.
International Preliminary Report on Patentability and Written Opinion mailed Mar. 22, 2011 in PCT/US2008/076711, 7 pages.

* cited by examiner

*Primary Examiner* — Daniel Hess
*Assistant Examiner* — Rafferty Kelly
(74) *Attorney, Agent, or Firm* — Kilpatrick Townsend & Stockton LLP

(57) ABSTRACT

A card can be used to make a payment or to gain access to a secure facility. The card embeds a chip, a passive circuit, and an antennae that receives frequencies upon which the chip executes corresponding payment and access applications. The passive circuit powers the chip upon being energized by an external circuit that emits the frequencies. The card docks into a card dock having a user interface. The user interface has buttons which, when particularly engaged, permits reception of one of the frequencies that energizes the passive circuit to power the chip for the execution of the corresponding application.

17 Claims, 12 Drawing Sheets

MULTIFUNCTIONAL PORTABLE CONSUMER PAYMENT DEVICE

FIELD

The present invention generally relates to a payment device, specifically to a consumer payment device, and more particularly to a multifunction portable consumer payment device.

BACKGROUND

As payment, identification, an access methods proliferate, consumers must carry a corresponding number of portable consumer devices to conduct everyday business and personal tasks. These devices include cards, tokens, fobs, etc. In would be an advantage in the art to reduce the number of such devices that the consumer must carry without losing the corresponding functionality.

SUMMARY

In one implementation, a portable device can be used by a consumer to conduct a transaction in a payment processing system. The portable device has a substrate. On or within the substrate is an antennae, a chip, and a passive circuit. The antennae is in communication with related circuitry to transmit and receive at plurality of frequencies each carrying data. The chip includes a microprocessor, memory containing instructions for a plurality of applications, and a memory management unit (MMU) controlling rights by the microprocessor to execute the instructions for each of the applications. The passive circuit powers the chip upon being energized by an external circuit that emits a frequency for permitting an access of a frequency for a payment.

The frequency for permitting an access carries access data received by the antennae such that the MMU allows the instructions in the memory for an application to permit access to be executed by the microprocessor to process the access data for the negotiation of access to a secure facility.

The frequency for a payment carries payment data received by the antennae such that the MMU allows access to the instructions in the memory for an application to make a payment be executed by the microprocessor to process the payment data for the negotiation of one said transaction in the payment processing system.

In another implementation, the portable device can be docked into a card dock such that the portable device and the card dock have a docked and undocked position thereof. The card dock has a user interface with a plurality of buttons and a system (i) to place the chip in electrical communication with the user interface; and (ii) to place the card in physical contact with the user interface. Each of the buttons, when engaged, corresponds to a specific frequency that can energize the passive circuit to power the chip. As such, one subset of the buttons, when engaged, corresponds to the frequency for a payment and another subset of the buttons, when engaged, corresponds to the frequency for permitting access to a secure facility.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

Figure 1:
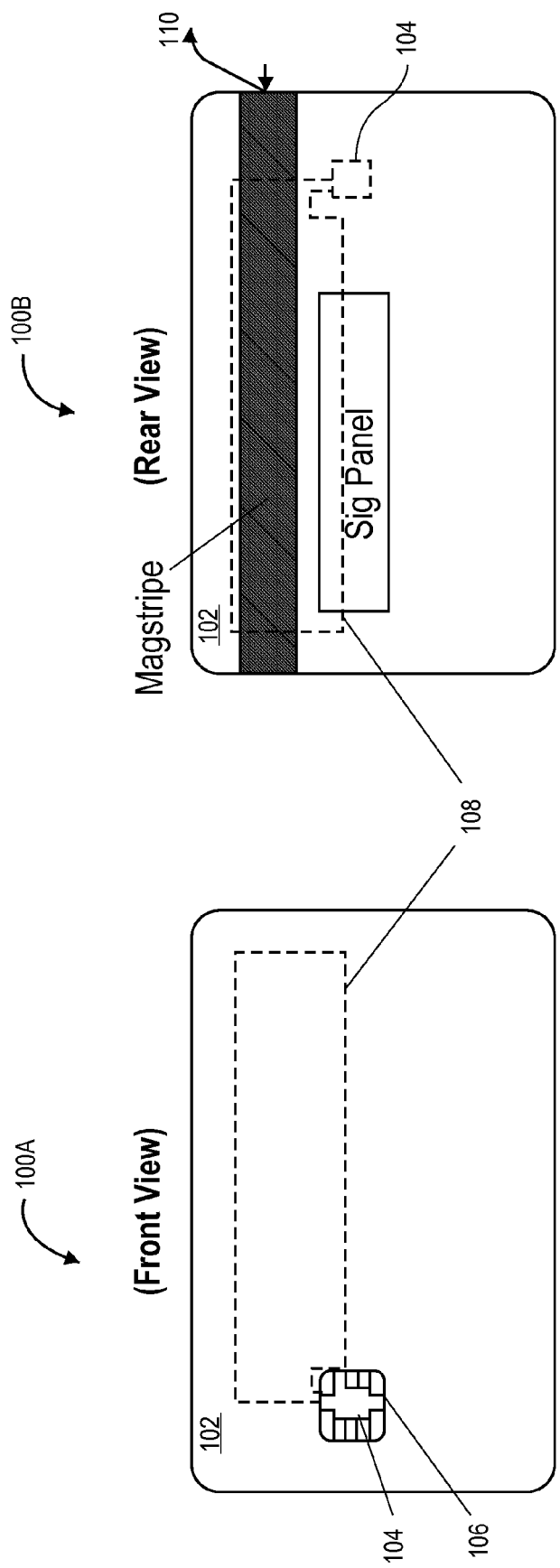
FIG. 1 shows plan views of the frontal face and the rear face of an exemplary implementation of a multi-application, multi-range, combination contact/contactless portable consumer device.

A portable device, or portable consumer device can be used by a consumer to conduct various function. One such function is a transaction in a payment processing system. The portable consume device is also useful in methods of identification or access such that a, consumer need only carry the portable consumer device in order to accomplish the functionality of these methods that are typically to conduct everyday business and personal tasks. The portable consumer device, in various implementations, can be a card (e.g.; credit card, debit card, stored value card, phone card, etc.), a token, a fob, etc. so that there would be a reduction to just one portable consumer device that the consumer carries, yet without losing the corresponding functionality.

The portable device has a substrate. Within and/or on the substrate is an antennae, a single chip, and a passive circuit. The passive circuit powers the chip upon being energized by frequency emitted by an external circuit frequency. The antennae is in communication with related circuitry to transmit and receive at plurality of frequencies, where each frequency carries data. The single chip includes a microprocessor, memory containing instructions for a plurality of applications, a memory management unit (MMU). The MMU controls rights by the microprocessor to execute the instructions for each of the applications. Using the frequency received by the antennae, the MMU controls the rights by the microprocessor to execute the instructions for each of the applications. As such, the MMU ensures that different frequencies correspond to the execution of one of the applications by the microprocessor. The MMU also ensure that each of the frequencies can correspond to the execution of only one of the applications by the microprocessor, and that none of the frequencies can correspond to the execution of more than one of the applications by the microprocessor.

When an external circuit emits a frequency corresponding to an application to permit access to a secure facility (e.g.; an access frequency), the passive circuit is energized to power the chip. Data carried by this frequency (e.g.; access data) is received by the antennae. The MMU allows the instructions in the memory for the access application to be executed by the microprocessor to process the access data for the negotiation of access to the secure facility.

When an external circuit emits a frequency corresponding to an application to pay for a transaction (e.g.; a payment frequency), the passive circuit is energized to power the chip. Data carried by the payment frequency (e.g.; payment data) is received by the antennae. The MMU allows the instructions in the memory for the payment application to be executed by the microprocessor to process the payment data for the negotiation of the transaction in the payment processing system. In the payment processing system, a transaction handler processes the transaction. The transaction is characterized by a merchant and the consumer engaging in the transaction upon an account within the payment processing system that an issuer has issued to the consumer. The merchant submits the transaction to an acquirer for processing by the transaction handler who requests to the issuer to disburse funds from the consumer for the transaction. The issuer forwards funds to the transaction handler who forwards the funds to the acquirer to disburse the funds to the merchant for the transaction.

The portable consumer device can also be received into a card dock. The card dock can have a user interface. The user interface can have buttons, switches, and the like. When one or more of the buttons are engaged, the frequency that can energize the passive circuit to power the chip will be limited. For instance, the engaging of a particular subset of the buttons will ensure that only one frequency can energize the passive circuit to power the chip. The user interface, and the card dock incorporating the same, can take many forms, including many in present circulation among consumers, such as a cellular telephone or personal digital assistant.

The card dock will also put the chip in electrical communication with the user interface and will place the substrate in physical contact with the user interface. As such, the memory may also include instructions for an application executable by the microprocessor to control the user interface.

In yet another implementation, the buttons on the card dock will include a plurality of subsets each corresponding one particular frequency and one particular application that is executable by the microprocessor. When the particular frequency is received by the antennae that corresponds to a particular subset of the buttons that are being engaged, the passive circuit will powers the chip such that the MMU will allow the instructions in the memory for the particular application to be executed by the microprocessor to process the data being carried by the particular frequency. Otherwise, the particular frequency received by the antennae will not permit the passive circuit to be energized so as to power the chip.

In a still further implementation, the substrate bears a magnetic strip having therein magnetically encoded data corresponding to the account in the payment processing system and useful to conduct the transaction in the payment processing system. In yet another implementation, the substrate bears a contact for physical and electrical communication with the chip.

When the frequency corresponding to the access application is received by the antennae, the MMU allows the instructions in the memory for the access application to be executed by the microprocessor to process the access data carried by the frequency. This execution controls the negotiation of access to a secure facility such as a network device. In another implementation, the negotiation is for physical access to a physical location, and in other implementation, the negotiation of logical access to a logical location such as a computer network device.

FIG. 1 illustrates an exemplary implementation of a multi-application, multi-range, combination contact/contactless portable consumer device. In the present discussion, the portable consumer device is in the form of a card, however those skilled in the art will appreciate that the portable consumer device could take other forms, such as tokens, fobs, etc. The implementation includes a chip bearing substrate 102 containing a chip 104 connected to an antenna 108 in communication with related circuitry to transmit and receive a plurality of frequencies each carrying data. The chip bearing substrate 102 will preferably be as substantially rigid and thin as are conventional credit, debit, stored value, or smart cards, and also possess substantially similar dimensions.

Those of skill in the art will recognize that chip 104 may comprise a microprocessor chip, a microcontroller chip, a smart card chip, or any other suitable processor and that chip 104 is coupled to memory through a signal bus. The memory may comprise volatile memory such as CMOS or DRAM memory, nonvolatile memory such as ROM, PROM, EEPROM, or flash memory, or combinations thereof, and such memory is located in the same chip bearing substrate 102 as chip 104. Data stored in the memory includes code or program instructions for multiple applications executable by chip 104. Such applications may include, but are not limited to, identification protocols for access to a physical location or a computer network, procedures allowing an individual to purchase an item and debit his or her bank account, rules engaging the ignition of a car, or loyalty information confirming that an individual has a given membership and is therefore eligible for a discount or free service. A memory management unit (MMU) controls the execution of instructions for each application by chip 104.

The portable consumer device of FIG. 1 lacks a dedicated power source. In such implementations, the portable consumer device may optionally be powered by a passive circuit that is energized by an external circuit emitting a frequency that carries data. Upon antenna 108 receiving a frequency from the external circuit, chip 104 becomes active and the MMU allows access to instructions in memory for the execution of an application. Although the execution of a particular application may be triggered by receipt of different frequencies, each frequency received corresponds only to the execution of a specific application by the microprocessor.

When active, the portable consumer device communicates information to a receiving device, without physical contact, by antenna 108 emitting a frequency carrying data. For each application executed by the microprocessor, antenna 108 emits a specific corresponding frequency or range or frequencies, where each such frequency carries data. As with received frequencies, different frequencies can correspond to the execution of a single application, however, no specific frequency will correspond to the execution of more than one application.

The portable consumer device may also communicate to the receiving device through direct contact. In such implementations, this includes, but is not limited to, the receiving device having the capability to communicate electronically with the chip 104 via a contact plate 106 (shown on the front face 100A of the portable consumer device and located directly over the chip 104). Alternatively, the receiving device may communicate by physical contact with a magnetic stripe assembly 110 bearing magnetically encoded data (shown on the rear face 100B of the portable consumer device). The magnetic stripe assembly 110 may comprise, in one implementation, a reprogrammable magnetic stripe that accepts data and/or commands from chip 104 or an external source and formats and renders that data into a form on a magnetic stripe that is readable by conventional magnetic stripe-reading Point-Of-Service ("POS") terminals. In this manner, the portable consumer device, while only containing a single chip 104, is multi-functional, replacing the need to carry separate items such as credit cards, membership cards, pass keys for buildings, or car keys.

Figure 2:
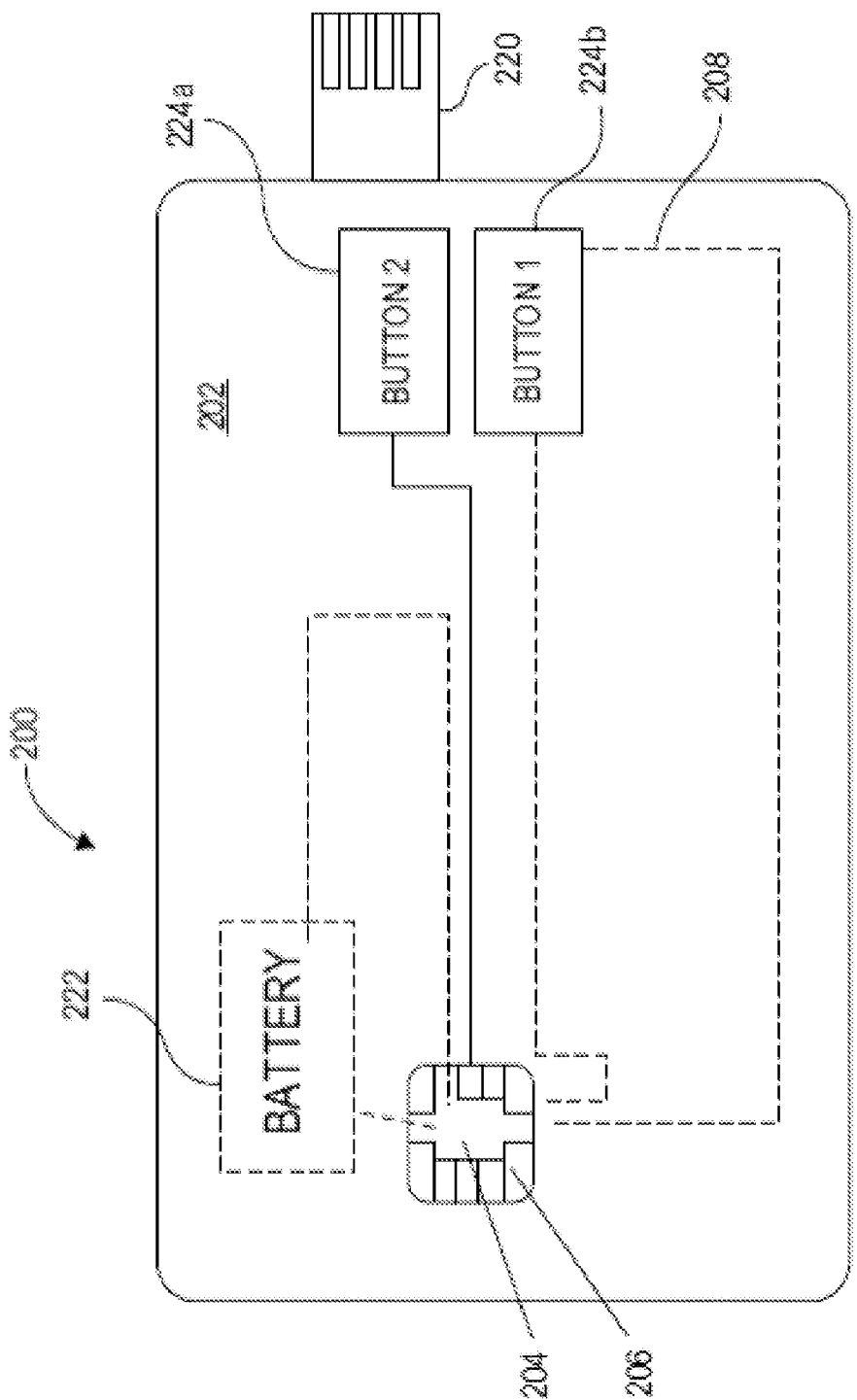
FIG. 2 shows a plan view of an exemplary implementation of a multi-application, multi-range, combination contact/contactless portable consumer device with an energy storage device and electrical circuitry seen in phantom.

FIG. 2 illustrates another implementation where a multi-application, multi-range, combination contact/contactless portable consumer device 200 includes a chip bearing substrate 202 containing a chip 204 connected to an antenna 208 as well as an energy storage device 222. The energy storage device 222 allows chip 204 to execute applications without being energized by an external circuit. It will be recognized by those skilled in the art that energy storage device 222 may include batteries, inductors, capacitors, or combinations thereof. In one implementation, energy storage device 222 comprises a thin film capacitor, and may utilize a single dielectric or a multilayer configuration alternating conducting layers and dielectric layers. Implementation of the energy storage device 222 as a single or multilayer capacitor provides the benefit of avoiding the use of the leakable and potentially dangerous electrolytes associated with batteries, while also allowing quick rechargeability. With no toxic electrolytes needed in the capacitor implementation, the portable consumer device may be more safely carried in a wallet or purse, and may also be disposed of with fewer environment toxicity concerns.

As with the previous implementation, the portable consumer device 200 may optionally communicate by emitting frequencies using antenna 208 or through physical contact by the use of, for example, a contact plate 206 or an interface device 220. In the illustrated implementation, the interface device 220 can be an Universal Serial Bus ("USB"), IEEE-1394 ("Firewire"), or any serial connector.

The chip bearing substrate 202 also includes buttons 224a and 224b connected to the chip 204. Each button, when engaged, causes the chip 204 to perform an action. For example, button 224a powers on or off the chip 204. In one implementation, button 224b connects to both the chip 204 and the antenna 208 and, when engaged, signals the antenna 208 to emit a different frequency than the one associated with a given application. Such functionality allows the user to, for example, change a short-range frequency to a long-range one. Thus, even though a purchasing application may normally be associated with a short-range frequency, a user could choose to temporarily use a long-range frequency when convenient, such as, for example, when driving through a tollbooth to conduct a toll transaction over a distant of approximately two (2) meters.

While the implementation in FIG. 2 illustrates only two buttons, it will be appreciated by those skilled in the art that any number of buttons could be included on chip bearing substrate 202. Where a plurality of buttons are present, they may be engaged in combinations or subsets thereof, each particular combination corresponding to a specific frequency and its application to be executed by the microprocessor. In one implementation of passive portable consumer devices, when the specific frequency is received by the antenna, a passive circuit is energized to power the chip 204 only when the corresponding combination or subset of buttons are engaged. The MMU then allows the execution of instructions in memory for the related application to process data carried by the specific frequency.

Figure 3:
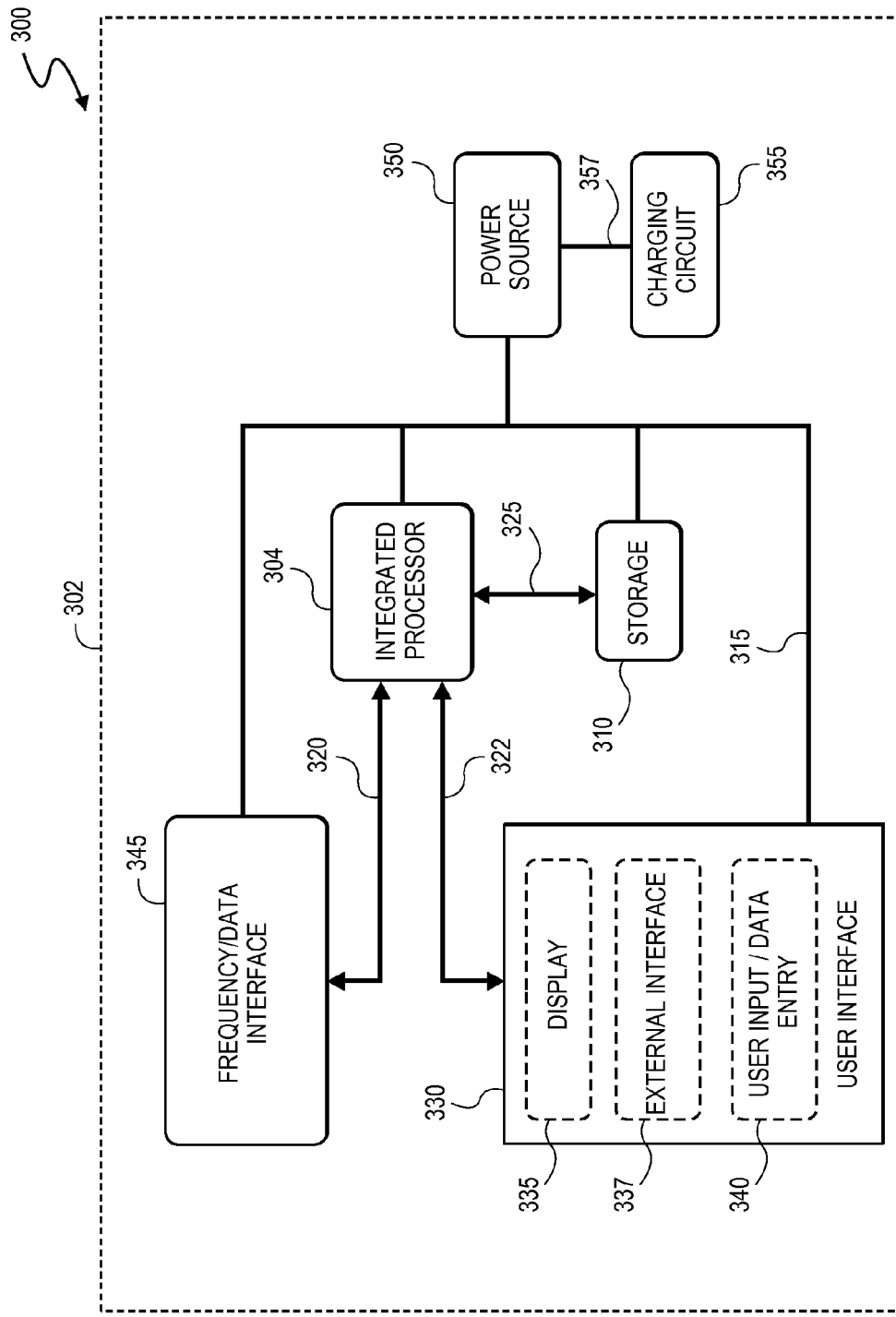
FIG. 3. depicts a block diagram of an exemplary implementation of a multi-application, multi-range, combination contact/contactless portable consumer device.

A block diagram for an exemplary implementation of a multi-application, multi-range, combination contact/contactless portable consumer device 300 is seen in FIG. 3. The portable consumer device 300 comprises an assembly 302 that houses, supports, and/or integrates the components shown in FIG. 3. The portable consumer device 300 includes an integrate processor or chip 304 coupled to a power circuit 315. The power circuit 315 provides power to the electronic components 304, 310, 330, 345, and 350 of portable consumer device 300, and may further include signals indicating charging or connection status. The chip 304 is further coupled to signal buses 320, 322, and 325, which those of skill in the relevant arts will recognize may be comprised of a plurality of individual dedicated signal circuits, commonly shared signal buses, bidirectional signal circuits, unidirectional signal circuits, or combinations thereof. In one implementation, signal buses 320, 322, and 325 comprise a single commonly shared address/data bus with associated control signals. The chip 304 is coupled to a memory 310 through signal bus 325.

An optional onboard energy storage device 350 is coupled to and energizes the power circuit 315. The energy storage device 350, via a coupling 357, is optionally in electrical communication with a charging interface 355. Those of skill in the relevant arts will readily recognize that the charging interface 355 may be implemented with electrical contacts to an external charger, or an inductor for receiving power via electromagnetic radiation.

The portable consumer device 300 includes an optional user interface 330 coupled to the power circuit 315 and to the chip 304 via signal bus 322. In one implementation, the user interface may include one or more conventional displays 335 that may output text, graphics, or a combination. The display 335 may be implemented in such formats as a liquid crystal display, a thin film transistor display, touch screen, or organic LED display. The user interface 330 also includes an optional data entry apparatus 340. In one implementation, the data entry apparatus 340 may include an array of buttons labeled in a manner such as a QWERTY keyboard, a touch pad, a touch screen, or in a more simplistic implementation, as a telephone touch pad with alphanumeric key assignments. In one implementation, the buttons in the data entry apparatus 340 may comprise blister buttons commonly known in the art. The user interface 330 may also include an optional on/off button that activates the portable consumer device 300.

A frequency/data interface area 345 is also provided. The frequency/data interface area 345 consists of an antenna in communication with related circuitry to receive and emit a plurality of frequencies carrying data and may receive power from power circuit 315. When an external frequency is received, the frequency/data interface area 345 sends the data to the chip 304 via signal bus 320. The chip 304 executes the application related to the frequency received. Processed data may then be sent back to the frequency/data interface area 345 and emitted. Additionally, data received via the user interface 330 may cause the frequency/data interface area 345 to emit a frequency carrying data corresponding to an executed application prior to receiving any external frequencies.

Figure 4:
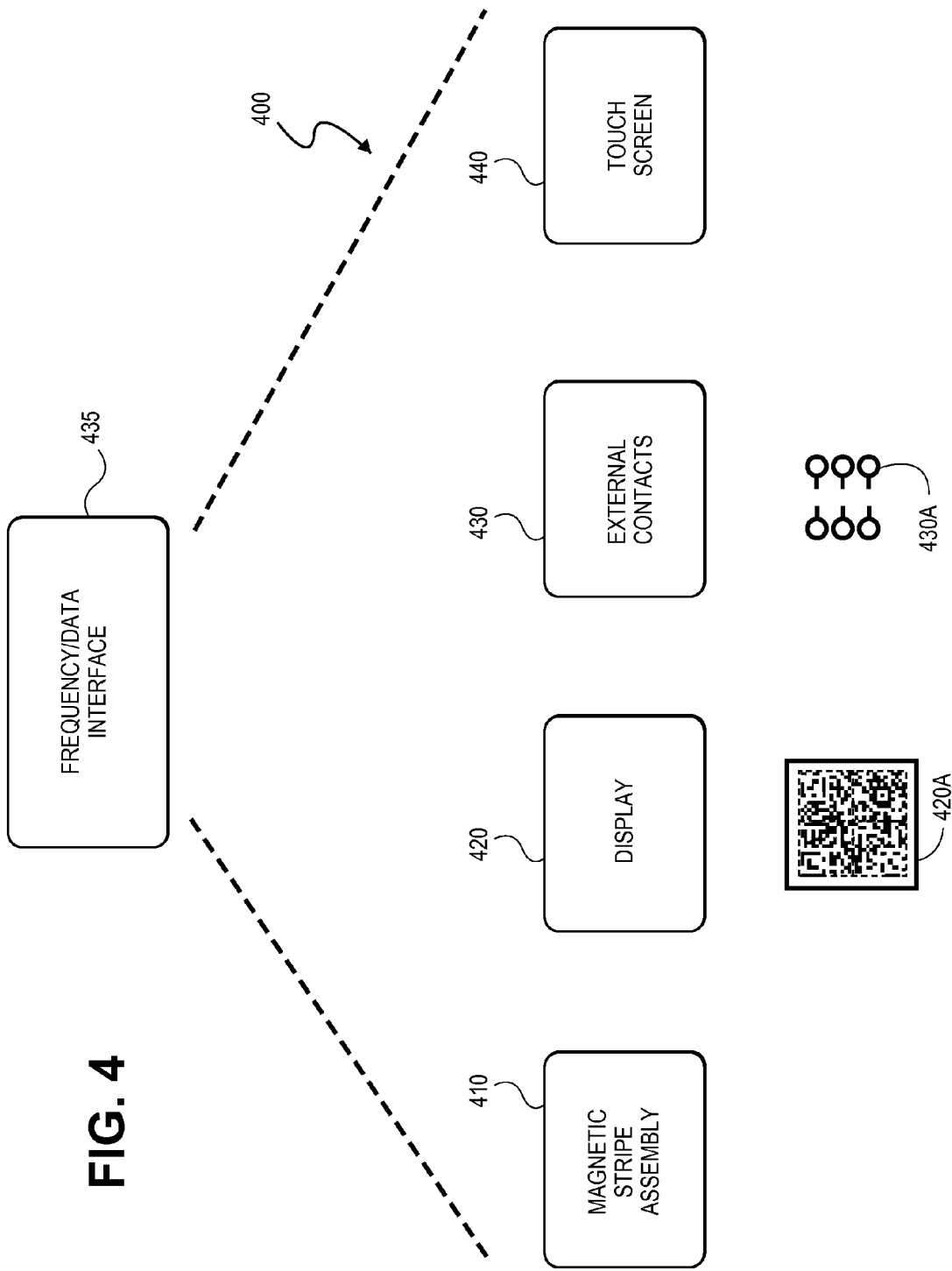
FIG. 4. illustrates alternative exemplary implementations of the frequency/data interface depicted in FIG. 3.

FIG. 4 illustrates non-limiting examples of a frequency/data interface area 435 consisting of manners for external communication in addition to an antenna. Such examples are shown at reference numeral 400 and include a magnetic stripe assembly 410, a display 420, electrical contacts 430, and a touch screen 440. One skilled in the art will recognize that any combination of the additional modes of external communication may co-exist and be utilized within the frequency/data interface area 435 to provide flexibility of use and ease of access.

The magnetic stripe assembly 410 may comprise a reprogrammable magnetic stripe that accepts data and/or commands from either the portable consumer device's chip or an external source and formats and renders data into a form on a magnetic stripe that is readable by conventional magnetic stripe-reading POS terminals.

The frequency/data interface area 435 may also include a display 420. In one implementation, data may be rendered in the form of an optically-readable area, such as a one dimensional or two dimensional bar code 420A. In this manner receiving devices may optically scan the display 420 with conventional laser scanners, and obtain account information.

Electrical contacts 430 are another alternative mode of external communication that may be included in the frequency/data interface area 435. With the portable consumer device possessing physical contacts such as an array of conductive pads or shapes 430A, the portable consumer device may be placed in physical contact with a receiving device, and the electrical contacts 430 may establish connectivity to the receiving device's processing system. The portable consumer device's chip may then receive and relay data to and from the receiving device through the contact interface, thereby allowing the portable consumer device to be utilized with the large number of preexisting receiving devices.

Alternatively, frequency/data interface area 435 may include a touch screen 440 and data may be received by touching the touch screen 440 in specified areas to indicate sequences of numbers, selected graphical elements, or drag strokes. Such data is then transferred to the chip for processing.

Figure 5:
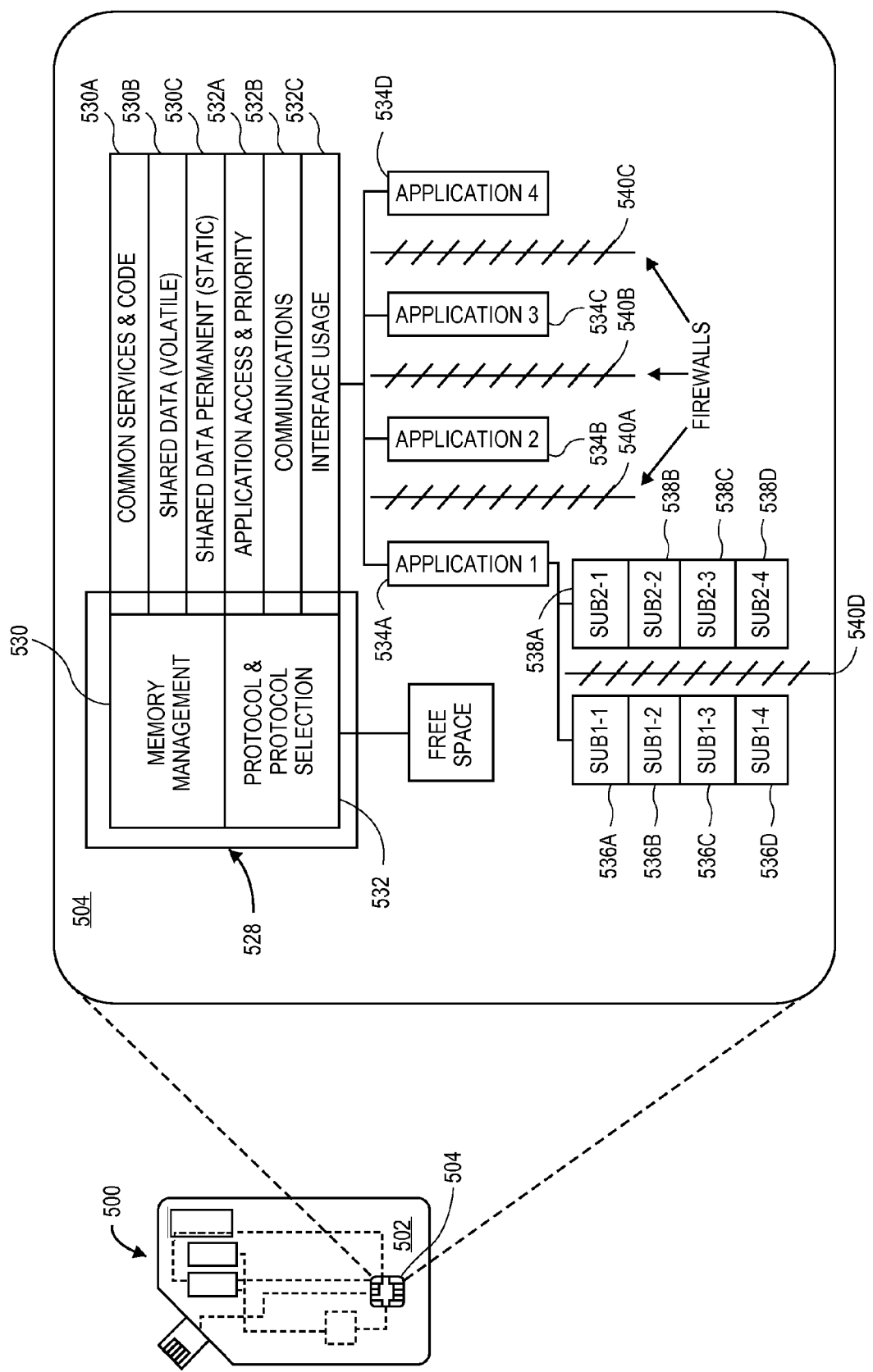
FIG. 5 shows an exploded view depicting, for the chip seen in FIG. 2, a block diagram of an exemplary implementation of the chip.

FIG. 5 illustrates an exemplary implementation of the internal structure of a chip, which will preferably be a single chip. Portable consumer device 500 includes a chip bearing substrate 502 containing a chip 504. The chip 504 contains a memory management system 528. As shown in the illustration, the memory management system 528 is divided into a memory management unit (MMU) 530 and a protocol unit 532. The MMU 530 contains routines and data shared by all applications (534A-534D) on the chip 504. These include common services and code 530A, shared volatile data 530B, and shared static data 530C. The shared volatile data 530B consists of data common to all of the applications which can be rewritten during the process of communicating with a receiving device. Similarly, shared static data 530C includes common data which not rewriteable.

The protocol unit 532 includes access and priority rules 532A, communication rules 532B, and interface usage rules 532C for applications 534A-534D. When the chip 504 is communicating to a receiving device, the access and priority rules 532A identifying which applications are permitted to be accessed and in what priority for such access. For example, one application may provide access to an individual's bank account and another application may provide loyalty information for a particular service for a merchant. Thus, if an individual using public transportation receives every twentieth ride free, the chip 504 may communicate with the public transportation receiving device by, according to the access and priority rules 532A, first accessing the loyalty application to determine if the individual is eligible for a free ride and if, not, then engaging the account application to pay the fare for the ride.

The communication rules 532B provide the protocol for the chip 504 to communicate with receiving devices and for applications 534A-534D to communicate with each other. The interface usage rules 532C sends, receives, and processes commands from sources external to the chip 504 such as, for example, buttons, card docks, or receiving devices.

Applications 534A-534D are each stored in separate memory housed on the chip 504. In the current implementation, each application accesses only its own memory and is prevented from accessing the memory of another application by firewalls 540A-540C. Thus, for an application to receive or send information to another application, the application must first access the common memory management system 528 and utilize the protocol unit 532. The protocol unit 532 acts as a gatekeeper, using the communication rules 532B to determine if and how the application is allowed to communicate with another application. Other implementations include firewalls only between some of the applications, allowing the other applications to directly communicate without accessing the memory management system 528.

Optionally, applications can be structured to contain sub-applications that may or may not be able to communicate with each other. As illustrated in FIG. 5, application 534A contains sub-applications 536A-536D and 538A-538D, each stored in separate memory housed on the chip 504. In the shown implementation, sub-applications 536A-536D communicate directly with each other and sub-applications 538A-538D communicate directly with each other. However sub-applications 538A-538D are prevented from accessing the memory of sub-applications 536A-536D by a firewall 540D. Thus, for example, for sub-application 536B to send or receive information from sub-application 538D, sub-application 536B must first communicate with application 534A to determine if and how sub-application 536B will communicate with sub-application 538D.

Figure 6B:
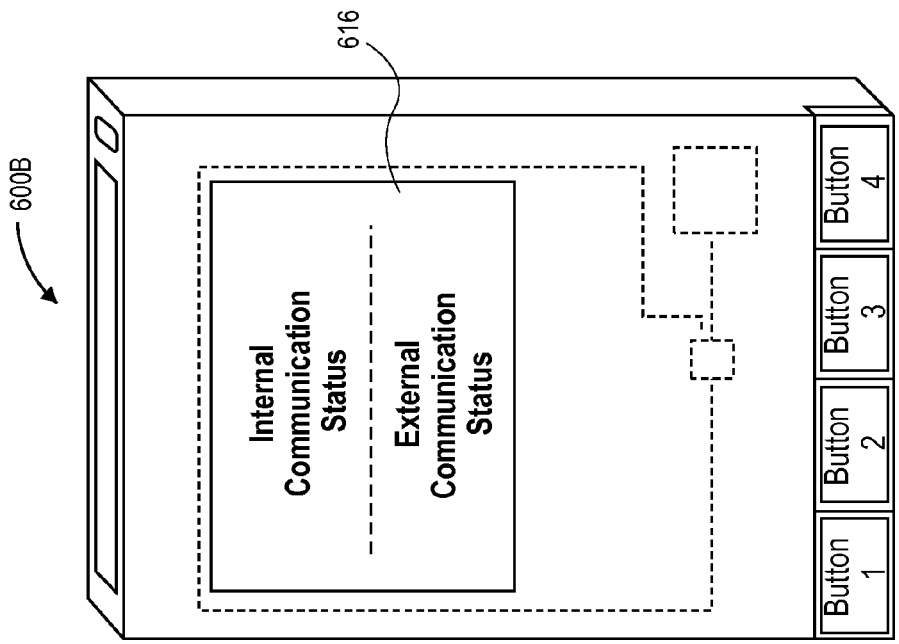
FIGS. 6A-6B show front elevational views of two different exemplary implementations of a card dock for a multi-application, multi-range, combination contact/contactless portable consumer device.
Figure 6A:
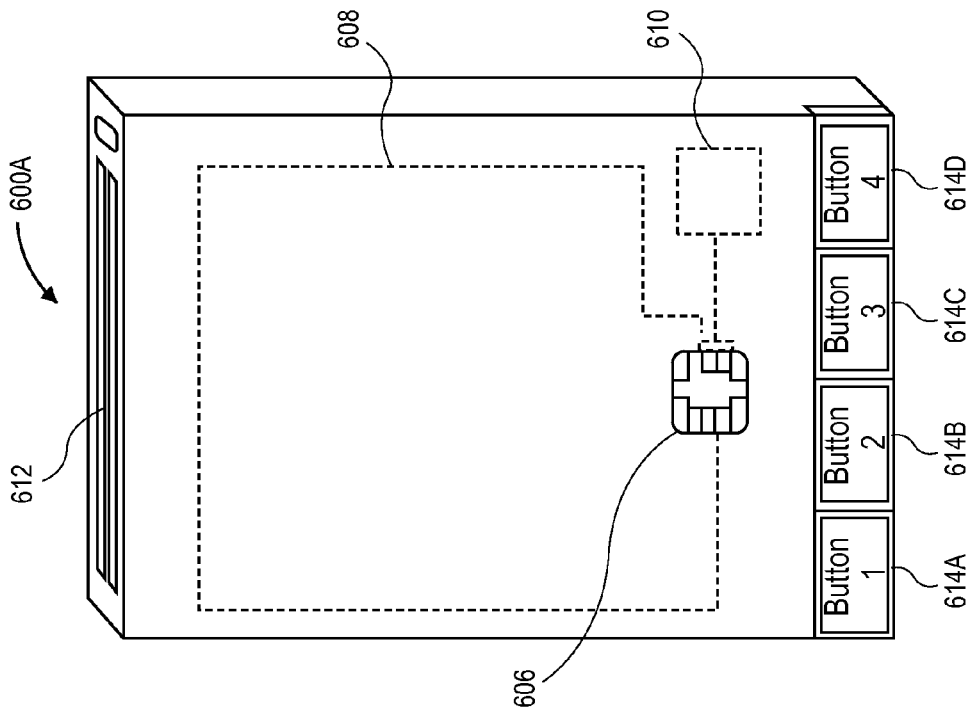

FIG. 6 illustrates an implementation of a card dock 600A having a slot 612. Slot 612 is adapted such that a portable consumer device, as disclosed herein, can be inserted into the card dock 600A. In the shown implementation, card dock 600A substantially envelops the portable consumer device. Alternatively, a card dock according to the current implementation could partially envelop the portable consumer device.

Card dock 600A additionally includes: energy storage device 610, contact plate 606, and buttons 614A-614D. When a portable consumer device is inserted into card dock 600A via slot 612, the contact plate 606 is positioned inside of slot 612 such that it makes physical contact with a contact plate (e.g.; not shown) on the portable consumer device, allowing the portable consumer device and the card dock 600A to communicate electronically. In alternative implementations, physical contact may be made via USB, IEEE-1394, or other serial connection. Energy storage device 610 provides power for the card dock 600A and, optionally, for passive portable consumer devices.

Buttons 614A-614D change the functionality of the portable consumer device when it is inserted into card dock 600A via slot 612. For example, button 614A powers on or off power source 610. The remaining array of buttons, 614B-614D, optionally signal the portable consumer device to receive, and process data carried in, a frequency other than the frequency normally associated with a given application. Buttons 614B-614D may be configured to act individually or in combination, each particular combination corresponding to a specific frequency and application to process data carried by the specific frequency. Thus, in one implementation, button 614B may change the frequency received by the portable consumer device for processing its carried data with the related application, while engaging button 614B in combination with 614C may change the frequency for the related application. In another implementation, only when a specific sub-set of buttons are engaged, and only when a specific frequency is received by the antenna of the passive portable consumer device, the passive circuit in the portable consumer device may be energized so as to power the chip to process data carried in the specific frequency by executing a corresponding specific application stored in the memory of the chip as permitted by the MMU in the chip. It is envisioned that additional buttons could be added to the implementation for still further functionality.

Card dock 600A includes an antenna 608. In one implementation, the portable consumer device would not have its own antenna and would instead make use of antenna 608 to provide a means for receiving multiple frequencies. In another implementation antenna 608 receives altered frequencies associated with the use of buttons 614B-614D.

Card dock 600B illustrates another implementation of a card dock to receive a portable consumer device. In addition to the characteristics associated with card dock 600A, card dock 600B includes a display 616, providing a user interface for interacting with the portable consumer device when it is inserted into card doc 600B. Display 616 includes, but is not limited to, liquid crystal displays, plasma displays, or light emitting diode displays. Additionally, display 616 may include a graphical user interface operated by buttons and/or a touch screen.

Figure 7:
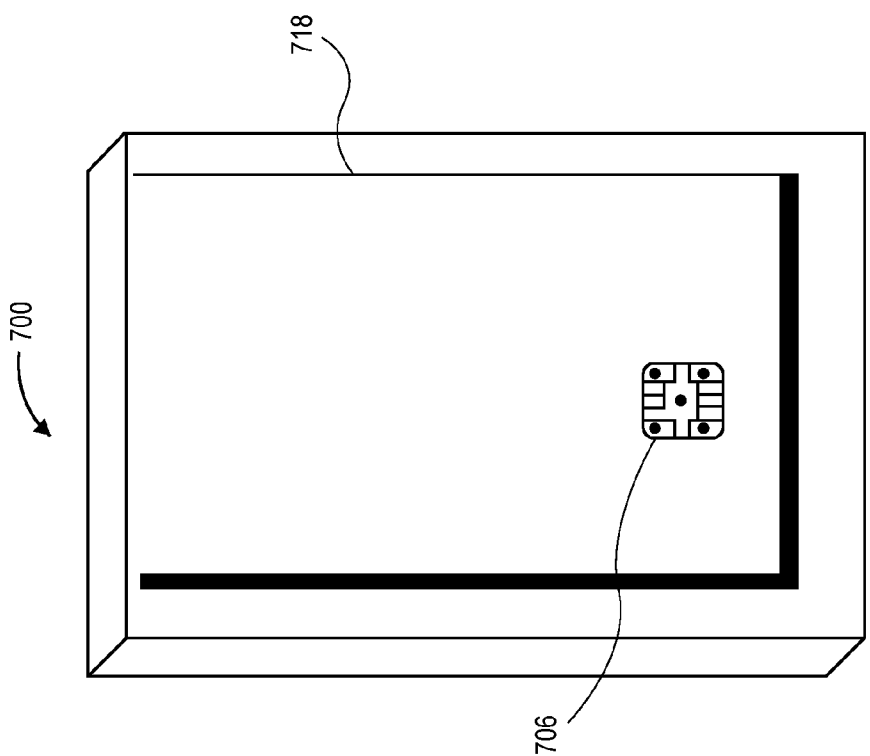
FIG. 7 shows a front elevational view of the rear side of an exemplary implementation of a card dock for a multi-application, multi-range, combination contact/contactless portable consumer device.

FIG. 7 illustrates yet another implementation of a card dock to receive a portable consumer device. Viewed from the rear face, card dock 700 includes card holder rails 718 rather than an enveloping slot such as is depicted for card docks 600A and 600B. The card holder rails 618 may be in the form of a tongue-and-groove system whereby the portable consumer device slides along a groove created by the card holder rails 618 and is held in place by the overlapping edges of the card holder rails 618 and optionally a friction fit. Thus, the portable consumer device is primarily exposed when inserted. In this implementation, and when card dock 700 is in an engaged position thereof with the portable consumer device, the portable consumer device is inserted along the card holder rails 718, the contact plate 706 located on the surface of card dock 700 is positioned such that the contact plate 606 is in physical contact with the contact plate (not shown) of the portable consumer device, allowing the chip of the portable consumer device to communicate electronically with the card dock 700.

Figure 8:
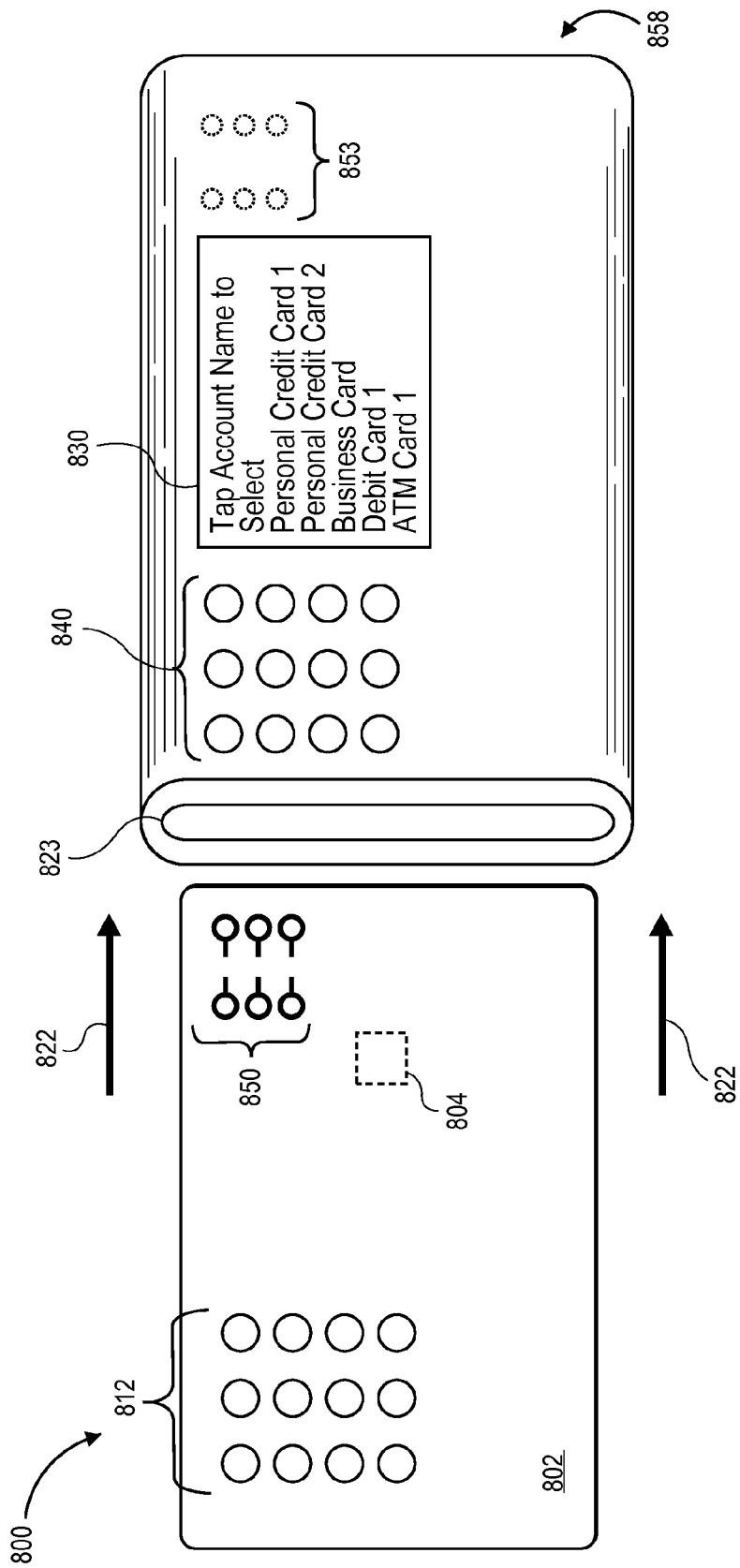
FIG. 8 shows a plan view of the frontal face of an exemplary implementation of a multi-application, multi-range, combination contact/contactless portable consumer device and a card dock therefore, wherein the portable consumer device and card dock have a docked and undocked position thereof, and wherein the portable consumer device is depicted in the undocked position relative to the card dock.

FIG. 8 shows a yet another implementation of a multi-application, multi-range, combination contact/contactless portable consumer device 800 which includes a chip bearing substrate 802 containing a chip 804, an array of buttons 812, and an array of physical contacts 850. For contactless use of the portable consumer device 800, the array of buttons 812 may be employed. Individual buttons in the array of buttons 812 may be configured to act alone and/or in combination. When engaged, the buttons may send data to chip 804 for processing by a specific application and chip 804 may then receive a frequency containing data corresponding to the application via an embedded antenna (not shown). Alternatively, the buttons may alter the frequency received by the antenna in response to the execution of a specific application for the processing of data carried by that frequency.

For contact use, the portable consumer device 800 can be slid into slot 823 of card dock 858 as shown by arrows 822. Once inserted, the array of physical contacts 850 on the portable consumer device 800 align with the corresponding array of physical contacts 853 (shown in phantom) inside card dock 858, allowing electronic communication between the portable consumer device 800 and the card dock 858. One skilled in the relevant arts will readily appreciate that the arrays of physical contacts 850 and 853 may include more or less electrical contact elements than those shown depending on the particular use, and may be located together or separately on any side or portion of the portable consumer device 800 as required.

For increased functionality and interoperability, the implementation of card dock 858 additionally includes a user interface in the form of an array of buttons 840 and a display/touch screen 830. Individual buttons in the array of buttons 840 may be configured to act alone and/or in combination. When engaged, the buttons may, for example, alter the frequency corresponding to a given application or transmit data electronically to chip 804 via the arrays of physical contacts 850 and 853. Display/touch screen 830 may, optionally, display or receive data. The data displayed may include a optically-readable bar code. Those skilled in the relevant arts will recognize that such combination of features may be interchanged with those described in other aspects of the portable consumer device.

Figure 9:
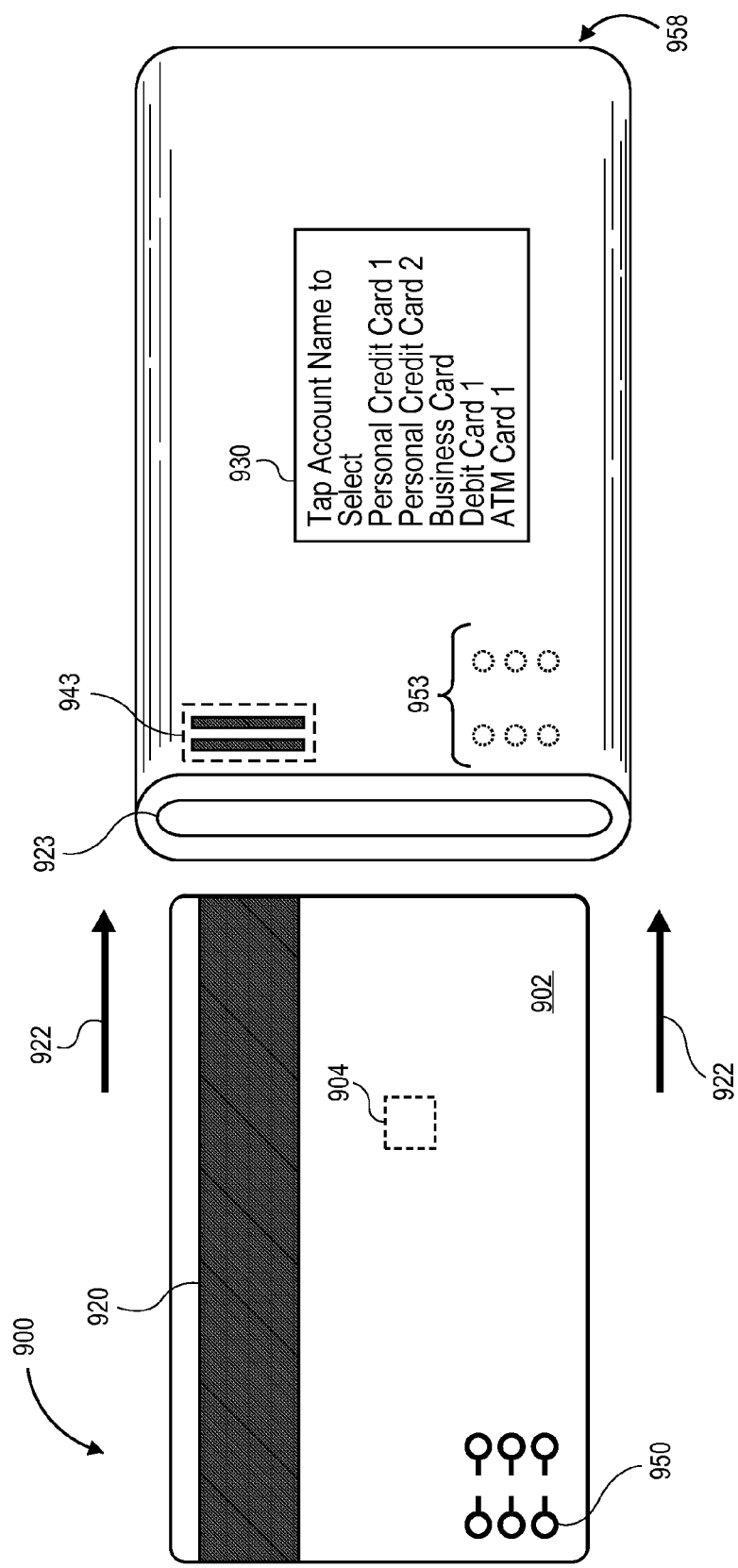
FIG. 9 shows a plain view of the rear face of the implementation of the portable consumer device and card dock depicted in FIG. 8.

FIG. 9 is one implementation of the rear view of a multi-application, multi-range, combination contact/contactless portable consumer device and an card dock engageable therewith. Portable consumer device 900 includes a chip bearing substrate 903 containing chip 904. Additionally, the current implementation includes a magnetic stripe 920 which like conventional magnetic stripe fields, is readable in preexisting POS terminals as well as the card dock 958. The magnetic stripe 920 may optionally be programmable by data and commands sent from the chip 904.

Also shown on the portable consumer device 900 is an optional array of physical contacts 950, which, when the portable consumer device 900 is slid into slot 923 of card dock 958 as shown by arrows 922, align with the corresponding array of physical contacts 953 inside card dock 958. The contact between the arrays of physical contacts 950 and 953 allow for electronic communication between the portable consumer device 900 and the card dock 958.

Card dock 958 additionally includes a display/touch screen 930, for the input and display of data, and a port 943. Port 943 may be used to input and receive data and may be configured to accept USB, IEEE-1394, or other serial connection. Alternatively, port 943 may be configured to accept a power cable, alleviating the need for either the portable consumer device 900 or the card dock 958 to have an internal energy storage device. Those skilled in the relevant arts will appreciate that the features illustrated in the current implementation may be used concurrently with any other feature described herein.

Figure 10:
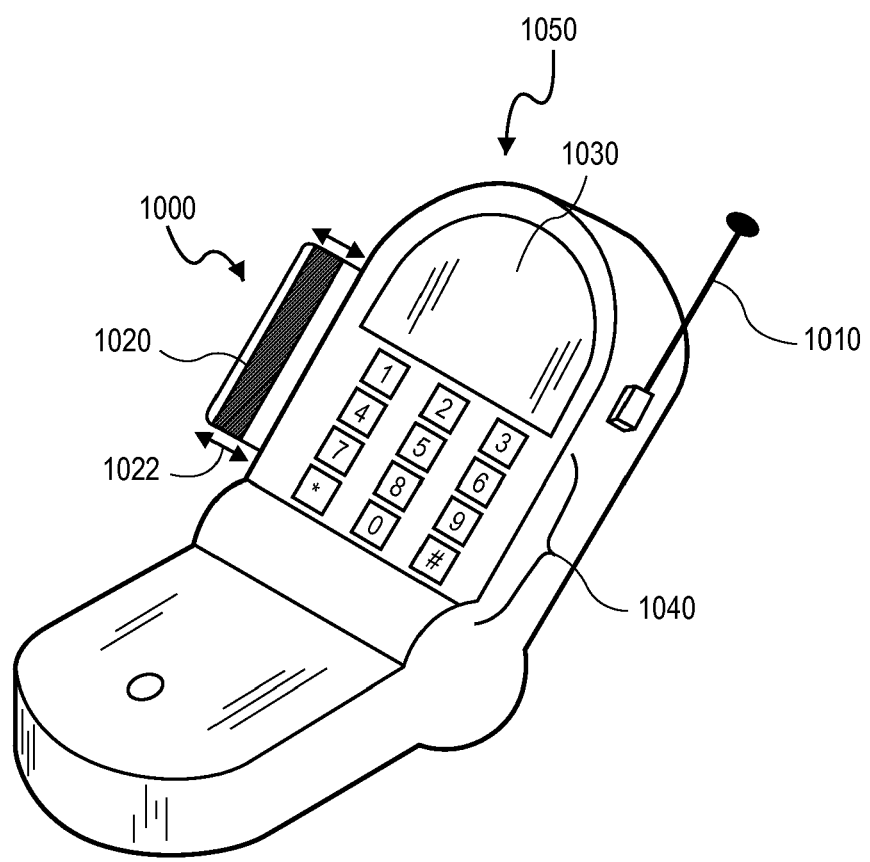
FIG. 10 shows a perspective view of an exemplary implementation of a multi-application, multi-range, combination contact/contactless portable consumer device and a card dock therefore, wherein the portable consumer device and card dock have a docked and undocked position thereof, wherein the portable consumer device is depicted in the docked position relative to the card dock, and wherein the card dock is a cellular telephone.

FIG. 10 illustrates an implementation of a card dock where the card dock is a standard cellular telephone 1050. Portable consumer device 1000, having substantially the functionality as described herein, is inserted into a port (not shown) on cellular telephone 1050 as shown by arrow 1022. A connection between portable consumer device 1000 and the cellular telephone 1050 may be made in any manner commonly known including serial connection. Cellular telephone 1050 may also be configured to read a magnetic stripe 1020. Once the portable consumer device 1000 is inserted into cellular telephone 1050, data may be entered via an integral key pad 1040 and displayed on a display screen 1030. Frequencies carrying data may be received using an 1010 antennae of cellular telephone 1050, for subsequent processing of the data by an application executed by the single chip in portable consumer device 1000 as described herein.

Figure 11:
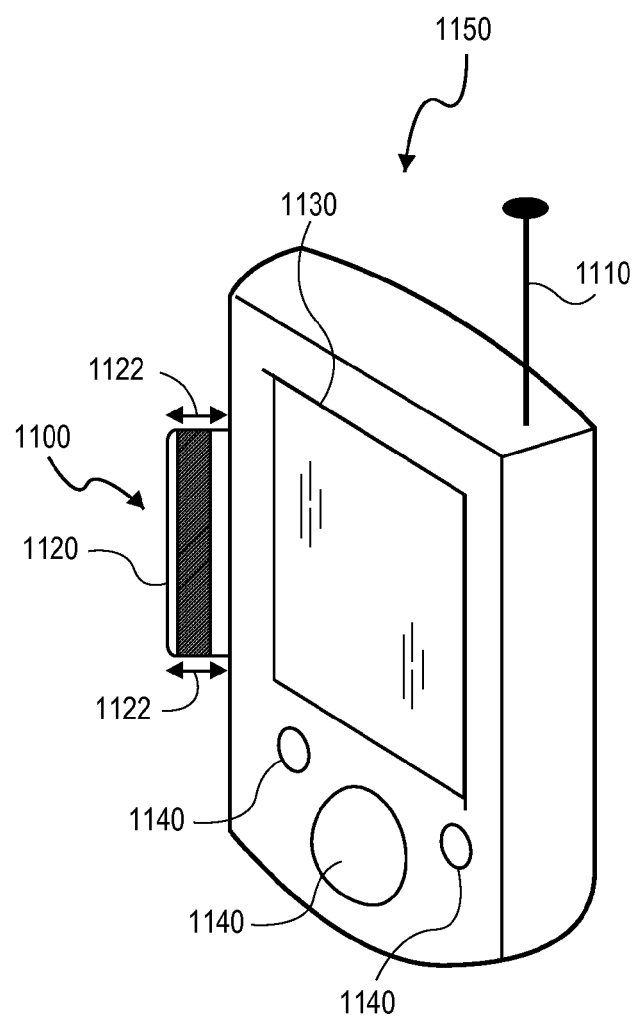
FIG. 11 shows a perspective view of an exemplary implementation of a multi-application, multi-range, combination contact/contactless portable consumer device and a card dock therefore, wherein the portable consumer device and card dock have a docked and undocked position thereof, wherein the portable consumer device is depicted in the docked position relative to the card dock, and wherein the card dock is a personal digital assistant.

FIG. 11 shows an implementation of a card dock where the card dock is a personal digital assistant ("PDA") 1150. Portable consumer device 1100 is inserted into a port (not shown) on PDA 1150 as shown by arrow 1122. A connection between portable consumer device 1100 and the PDA 1150 may be made in any manner commonly known including serial connection. PDA 1150 may also be configured to read a magnetic stripe 1120 on portable consumer device 1100. Buttons 1140 of PDA 1150 may be used to input data and may be of any commonly known form including a roller button. Touch screen 1130 also may allow for the input of data for execution by an application stored in the single chip of the portable consumer device 1100. Data may optionally be displayed on touch screen 1130, including in the form of optically-readable bar code. Frequencies carrying data may be received using an 1110 antennae of PDA 1150, for subsequent processing of the carried data by an application executed by the single chip in portable consumer device 1100 as described herein.

Figure 12:
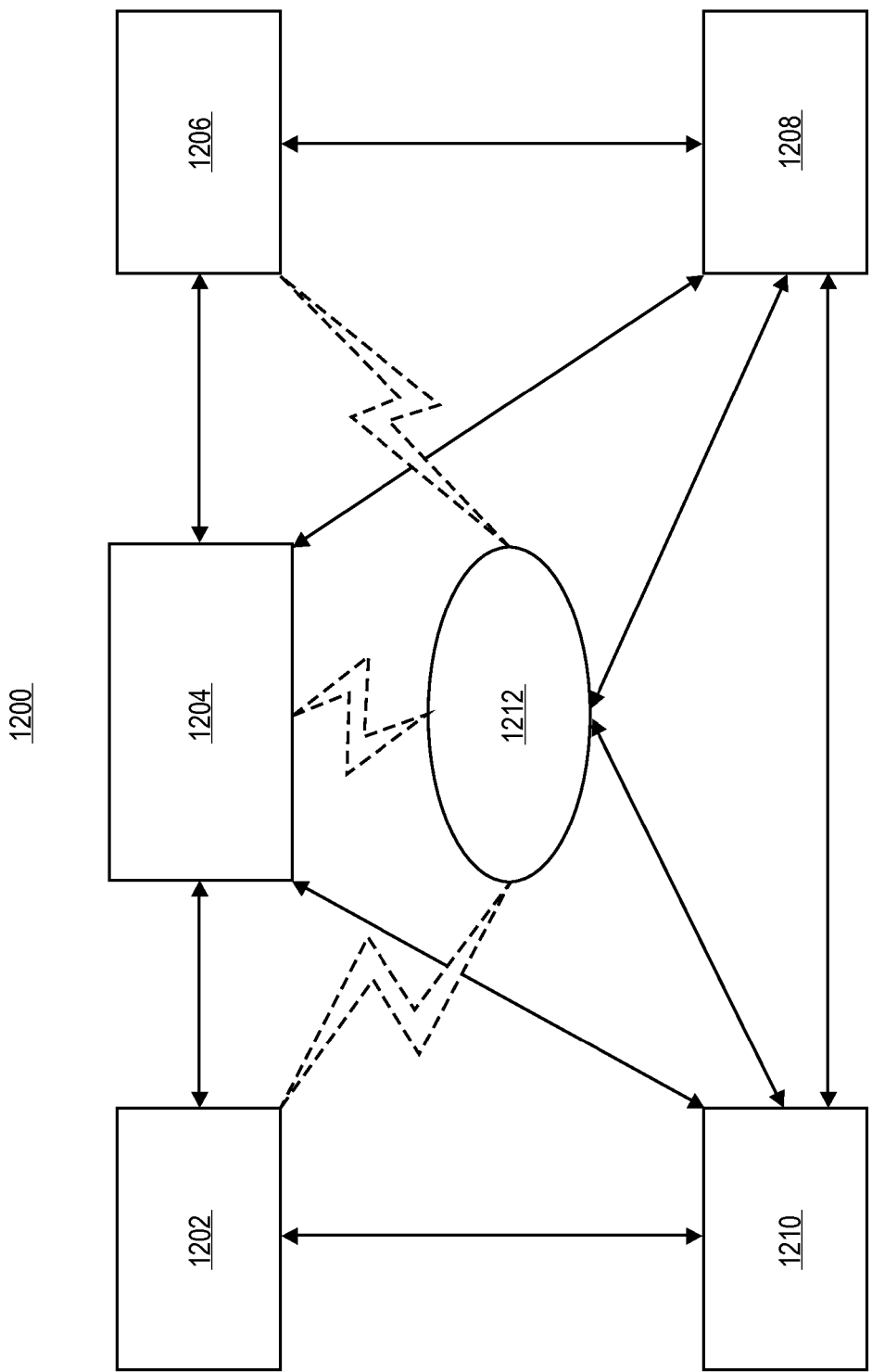
FIG. 12 is a block level diagram illustrating an exemplary payment processing system in which the portable consumer device seen in FIG. 1 can be used.

By way of example, and not by way of limitation, each of the disclosed portable consumer devices can be used in an exemplary payment processing system as illustrated in FIG. 12 and described below.

Referring to FIG. 12, in general, a transaction includes participation from different entities that are a component of a payment processing system 1200 including an issuer 1202, a transaction handler 1204, such as a credit card company, an acquirer 1206, a merchant 1208, or a user 1210 such as an account holder or the consumer. The acquirer 1206 and the issuer 1202 can communicate through the transaction handler 1204. Merchant 1208 may be a person or entity that sells goods or services, such as been described about with reference to merchant M(m) 106. Merchant 1208 include, for instance, a manufacturer, a distributor, a retailer, a load agent, a drugstore, a grocery store, a gas station, a hardware store, a supermarket, a boutique, a restaurant, or a doctor's office. In a business-to-business setting, the user 1210 may be a second merchant making a purchase from another merchant 1208. Merchant 1208 may utilize at least one POS terminal that can communicate with the acquirer 1206, the transaction handler 1204, or the issuer 1202. Thus, the POS terminal is in operative communication with the payment processing system 1200.

Typically, a transaction begins with the user 1210, such as an account holder or a consumer, presenting a portable consumer device 1212, such as the consumer device C(c) 102, to merchant 1208 to initiate an exchange for a good or service. The portable consumer device 1212 may include a payment card, a gift card, a smartcard, a smart media, a payroll card, a health care card, a wrist band, a machine readable medium containing account information, a keychain device such as a SPEEDPASS® device commercially available from Exxon-Mobil Corporation or a supermarket discount card, a cellular phone, personal digital assistant, a pager, a security card, an access card, a wireless terminal, or a transponder. The portable consumer device 1212 may include a volatile or non-volatile memory to store information such as the account number or an account holder's name.

Merchant 1208 may use the POS terminal to obtain account information, such as an account number, from the portable consumer device 1212. The portable consumer device 1212 may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer 1202 of the portable consumer device 1212. Alternatively, or in combination, the portable consumer device 1212 may communicate with the issuer 1202, the transaction handler 1204, or the acquirer 1206.

The issuer 1202 may authorize the transaction using the transaction handler 1204. The transaction handler 1204 may also clear the transaction. Authorization includes the issuer 1202, or the transaction handler 1204 on behalf of the issuer 1202, authorizing the transaction in connection with the issuer 1202's instructions such as through the use of business rules. The business rules could include instructions or guidelines from the transaction handler 1204, the user 1210, merchant 1208, the acquirer 1206, the issuer 1202, a financial institution, or combinations thereof. The transaction handler 1204 may maintain a log or history of authorized transactions. Once approved, merchant 1208 will record the authorization, allowing the user 1210 to receive the good or service.

Merchant 1208 may, at discrete periods, such as the end of the day, submit a list of authorized transactions to the acquirer 1206 or other components of the payment processing system 1200. The transaction handler 1204 may compare the submitted authorized transaction list with its own log of authorized transactions. If a match is found, the transaction handler 1204 may route authorization transaction amount requests from the corresponding acquirer 1206 to the corresponding issuer 1202 involved in each transaction. Once the acquirer 1206 receives the payment of the authorized transaction amount from the issuer 1202, it can forward the payment to merchant 1208 less any transaction costs, such as fees. If the transaction involves a debit or pre-paid card, the acquirer 1206 may choose not to wait for the initial payment prior to paying the merchant 1208.

There may be intermittent steps in the foregoing process, some of which may occur simultaneously. For example, the acquirer 1206 can initiate the clearing and settling process, which can result in payment to the acquirer 1206 for the amount of the transaction. The acquirer 1206 may request from the transaction handler 1204 that the transaction be cleared and settled. Clearing includes the exchange of financial information between the issuer 1202 and the acquirer 1206 and settlement includes the exchange of funds. The transaction handler 1204 can provide services in connection with settlement of the transaction. The settlement of a transaction includes depositing an amount of the transaction settlement from a settlement house, such as a settlement bank, which the transaction handler 1204 typically chooses, into a clearinghouse, such as a clearing bank, that the acquirer 1206 typically chooses. The issuer 1202 deposits the same from a clearinghouse, such as a clearing bank, which the issuer 1202 typically chooses into the settlement house. Thus, a typical transaction involves various entities to request, authorize, and fulfill processing the transaction.

The steps of a method, process, or algorithm described in connection with the implementations disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A portable device for a consumer to conduct a transaction in a payment processing system, the portable device comprising a substrate having therein:
   an antenna in communication with related circuitry to transmit and receive at plurality of frequencies each carrying data;
   a chip including:
   a microprocessor;
   memory containing instructions for a plurality of applications; and
   a memory management unit (MMU) controlling rights by the microprocessor to execute the instructions for each said application;
   a passive circuit powering the chip upon being energized by an external circuit emitting:
     an access said frequency carrying access data received by the antenna such that the MMU allows the instructions in the memory for an access said application to be executed by the microprocessor to process the access data for the negotiation of access to a secure facility; and
     a payment said frequency carrying payment data received by the antenna such that the MMU allows access to the instructions in the memory for a payment said application to be executed by the microprocessor to process the payment data for the negotiation of one said transaction in the payment processing system;
   a user interface in electrical communication with the chip, the user interface having a plurality of buttons, at least one button of which, when engaged, limits the applications to be executed by the microprocessor to an application associated with a specific frequency;
   wherein the plurality of buttons include a plurality of subsets thereof, and each particular said subset corresponds to:
     a particular said frequency; and
     a particular said application;
   whereby when the particular said frequency is received by the antenna:
     the particular said frequency received by the antenna is permitted to energize the passive circuit to power the chip only when the corresponding particular said subset is engaged, such that the MMU allows the instructions in the memory for the corresponding particular said application to be executed by the microprocessor to process the data being carried by the particular said frequency; and
     the particular said frequency received by the antenna is not permitted to energize the passive circuit to power the chip when the particular said subset is not engaged.

2. The portable device as defined in claim 1, wherein the substrate further comprises a magnetic strip bearing magnetically encoded data corresponding to the account and for conducting one said transaction in the payment processing system.

3. The portable device as defined in claim 1, wherein the substrate further comprises a contact for physical and electrical communication with the chip.

4. The portable device as defined in claim 1, wherein when the access said frequency carrying the access data is received by the antenna, the MMU allows the instructions in the memory for the access said application to be executed by the microprocessor to process the access data for the negotiation of physical access to a physical location.

5. The portable device as defined in claim 1, wherein when the access said frequency carrying the access data is received by the antenna from the external circuit:
   the passive circuit is energized and powers the chip;
   the MMU allows the instructions in the memory for the access said application to be executed by the microprocessor to process the access data for the negotiation of logical access to a logical location.

6. The portable device as defined in claim 5, wherein the logical access to the logical location is access to a computer network device.

7. The portable device as defined in claim 1, wherein the secure facility is a computer network device.

8. The portable device as defined in claim 1, wherein the MMU, using the frequency received by the antenna, controls the rights by the microprocessor to execute the instructions for each said application such that:
   different said frequencies can correspond to the execution of a single said application by the microprocessor;
   each said frequency can correspond to the execution of only one said application by the microprocessor; and
   no said frequency can correspond to the execution of more than one said application by the microprocessor.

9. The portable device as defined in claim 1, wherein the user interface is selected from the group consisting for a cellular telephone, a card docking station, and a personal digital assistant.

10. A portable device for a consumer to conduct a transaction in a payment processing system, the portable device comprising a substrate having therein:
    an antenna in communication with related circuitry to transmit and receive at plurality of frequencies each carrying data;
    a chip including:
    a microprocessor;
    memory containing instructions for a plurality of applications; and
    a memory management unit (MMU) controlling rights by the microprocessor to execute the instructions for each said application and, using the frequency received by the antenna, controlling the rights by the microprocessor to execute the instructions for each said application such that:
    different said frequencies can correspond to the execution of a single said application by the microprocessor;

each said frequency can correspond to the execution of only one said application by the microprocessor; and no said frequency can correspond to the execution of more than one said application by the microprocessor;

a passive circuit powering the chip upon being energized by an external circuit emitting:

an access said frequency carrying access data received by the antenna such that the MMU allows the instructions in the memory for an access said application to be executed by the microprocessor to process the access data for the negotiation of access to a secure facility; and a payment said frequency carrying payment data received by the antenna such that the MMU allows access to the instructions in the memory for a payment said application to be executed by the microprocessor to process the payment data for the negotiation of one said transaction in the payment processing system;

a user interface in electrical communication with the chip, the user interface having a plurality of buttons, at least one button of which, when engaged, limits the applications to be executed by the microprocessor to an application associated with a specific frequency;

wherein the plurality of buttons include a plurality of subsets thereof, and each particular said subset corresponds to:

a particular said frequency; and a particular said application;

whereby when the particular said frequency is received by the antenna:

the particular said frequency received by the antenna is permitted to energize the passive circuit to power the chip only when the corresponding particular said subset is engaged, such that the MMU allows the instructions in the memory for the corresponding particular said application to be executed by the microprocessor to process the data being carried by the particular said frequency; and the particular said frequency received by the antenna is not permitted to energize the passive circuit to power the chip when the particular said subset is not engaged.

11. The portable device as defined in claim 10, wherein the substrate further comprises a magnetic strip bearing magnetically encoded data corresponding to the account and for conducting one said transaction in the payment processing system.

12. The portable device as defined in claim 10, wherein the substrate further comprises a contact for physical and electrical communication with the chip.

13. The portable device as defined in claim 10, wherein when the access said frequency carrying the access data is received by the antenna, the MMU allows the instructions in the memory for the access said application to be executed by the microprocessor to process the access data for the negotiation of physical access to a physical location.

14. The portable device as defined in claim 10, wherein when the access said frequency carrying the access data is received by the antenna from the external circuit:

the passive circuit is energized and powers the chip; and the MMU allows the instructions in the memory for the access said application to be executed by the microprocessor to process the access data for the negotiation of logical access to a logical location.

15. The portable device as defined in claim 14, wherein the logical access to the logical location is access to a computer network device.

16. The portable device as defined in claim 10, wherein the secure facility is a computer network device.

17. The portable device as defined in claim 10, wherein the user interface is selected from the group consisting for a cellular telephone, a card docking station, and a personal digital assistant.

* * * * *

UNITED STATES PATENT AND TRADEMARK OFFICE
CERTIFICATE OF CORRECTION

| | | |
|---|---|---|
| PATENT NO. | : 8,408,454 B2 | Page 1 of 1 |
| APPLICATION NO. | : 12/211753 | |
| DATED | : April 2, 2013 | |
| INVENTOR(S) | : Hammad | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1005 days.

Signed and Sealed this
Seventh Day of October, 2014

Michelle K. Lee
*Deputy Director of the United States Patent and Trademark Office*